(12) United States Patent
Kassner

(10) Patent No.: US 8,024,103 B2
(45) Date of Patent: Sep. 20, 2011

(54) METHOD AND DEVICE FOR MONITORING AN EXHAUST GAS TURBOCHARGER OF AN INTERNAL COMBUSTION ENGINE

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 792 days.

(21) Appl. No.: 12/074,590

(22) Filed: Mar. 4, 2008

(65) Prior Publication Data
US 2008/0234887 A1   Sep. 25, 2008

(30) Foreign Application Priority Data
Mar. 20, 2007 (DE) .......................... 10 2007 013 251

(51) Int. Cl.
*G06F 19/00* (2006.01)
*F02B 33/46* (2006.01)

(52) U.S. Cl. ...... 701/100; 60/602; 60/605.2; 60/39.465; 60/737

(58) Field of Classification Search .................. 701/100, 701/101, 103, 108; 60/605.2, 602, 39.465, 60/737
See application file for complete search history.

(56) References Cited

U.S. PATENT DOCUMENTS

| 5,732,676 A * | 3/1998 | Weisman et al. ............. 123/436 |
| 6,601,387 B2 * | 8/2003 | Zurawski et al. ............ 60/605.2 |
| 2003/0145591 A1 * | 8/2003 | Arnold ............................. 60/602 |
| 2005/0017709 A1 | 1/2005 | Stolfus et al. |
| 2007/0162243 A1 * | 7/2007 | Gelmetti et al. ................ 702/85 |

FOREIGN PATENT DOCUMENTS
DE          196 23 236       12/1997
DE     10 2004 047 116      10/2005
* cited by examiner

*Primary Examiner* — Ronnie Mancho
(74) *Attorney, Agent, or Firm* — Kenyon & Kenyon LLP

(57) ABSTRACT

A method and a device are described for monitoring an exhaust gas turbocharger of an internal combustion engine, which allow a diagnosis of the oil supply to an exhaust gas turbocharger. In at least one operating state of the internal combustion engine, a variable that is characteristic for the rotational speed of the exhaust gas turbocharger is ascertained. A variable that is characteristic for the rotational speed of the exhaust gas turbocharger is ascertained in the at least one operating state of the internal combustion engine. An operating state which is characterized by a change in the exhaust gas mass flow, which is linked to a change in the variable that is characteristic for the rotational speed of the exhaust gas turbocharger within a predefined tolerance range, is selected as the at least one operating state. A fault is recognized if one or more values outside the predefined tolerance range are established for the change in the variable that is characteristic for the rotational speed of the exhaust gas turbocharger in the selected operating state.

11 Claims, 4 Drawing Sheets

METHOD AND DEVICE FOR MONITORING AN EXHAUST GAS TURBOCHARGER OF AN INTERNAL COMBUSTION ENGINE

RELATED APPLICATION INFORMATION

This application claims the benefit of and priority to German Patent Application No. 10 2006 052 817.4, which was filed in Germany on Nov. 9, 2006, the disclosure of which is hereby incorporated by reference.

FIELD OF THE INVENTION

The present invention is directed to a method and a device for monitoring an exhaust gas turbocharger of an internal combustion engine.

BACKGROUND INFORMATION

Methods and devices for monitoring an exhaust gas turbocharger of an internal combustion engine, in which a variable that is characteristic for the rotational speed of the exhaust gas turbocharger is ascertained in at least one operating state of an internal combustion engine, are already known.

Thus, for example, DE 10 2004 047 116 A1 discusses a rotational speed measurement using a so-called eddy current sensor. The change in the inductance of a coil having alternating current flowing through it due to the relative movement of the conductive blades of the compressor wheel of the turbocharger in relation to the coil is analyzed.

Furthermore, producing a constant magnetic field using a permanent magnet of the compressor wheel and indirectly analyzing the resulting eddy currents in the compressor blades is known. Indirectly this means that the changing eddy current in the compressor blades produces an alternating magnetic field. DE 196 23 236 A1 discusses the use of a coil as a sensor, in which an AC voltage is induced by the alternating magnetic field, whose frequency is equal to the product of compressor rotational speed and number of compressor blades.

US 2005/0017709 A1 discusses the use of a magnetoresistive sensor element for detecting the described alternating magnetic field.

The signal characteristic for the rotational speed of the compressor and thus of the exhaust gas turbocharger, which is ascertained according to the described measuring principles, for example, is generally used in an engine control unit for regulating and monitoring the turbocharger. The sensitivity of an exhaust gas turbocharger to disturbances of the oil supply is problematic. The oil supply ensures sufficient lubrication of the bearings which support the shaft between the turbine and the compressor of the exhaust gas turbocharger, and is provided from the oil circulation of the engine. Contaminants of the oil and/or the lines result in a reduced oil supply of the exhaust gas turbocharger, as a result of which the bearings may be damaged and the exhaust gas turbocharger may be destroyed.

SUMMARY OF THE INVENTION

The method according to the present invention and the device according to the present invention for monitoring the exhaust gas turbocharger of an internal combustion engine having the features of the independent claims have the advantage in relation to the related art that an operating state which is distinguished by a change in the exhaust gas mass flow, which is linked to a change in the variable that is characteristic for the rotational speed of the exhaust gas turbocharger within a predefined tolerance range, is selected for the at least one operating state, and a fault is, recognized if one or more values outside the predefined tolerance range are established in the selected operating state for the change in the variable that is characteristic for the rotational speed of the exhaust gas turbocharger. Conclusions about the presence of possibly increased friction as a result of inadequate oil supply to the exhaust gas turbocharger may be drawn by this analysis of the change in the variable that is characteristic for the rotational speed of the exhaust gas turbocharger.

Advantageous refinements on and improvements of the method specified herein are possible through the measures further cited and described herein.

It is advantageous if the rotational speed of the exhaust gas turbocharger or an electrical voltage induced by the rotation of the exhaust gas turbocharger or a magnetic field produced by the rotation of the exhaust gas turbocharger is selected as the variable that is characteristic for the rotational speed of the exhaust gas turbocharger. These variables may be ascertained easily and allow reliable fault recognition.

Furthermore, it is advantageous if an operating state in which the exhaust gas turbocharger decelerates is selected for the at least one operating state. This operating state is characterized by a significant change in the exhaust gas mass flow and thus also of the rotational speed of the exhaust gas turbocharger and is therefore particularly well suitable for the analysis of the change in the variable that is characteristic for the rotational speed of the exhaust gas turbocharger in regard to the fault recognition. Therefore, the described fault recognition may be performed particularly easily and reliably in such an operating state.

It is particularly advantageous if an operating state in which the internal combustion engine is shut down or in which a transition from fired operation into overrun operation occurs is selected as the at least one operating state. The exhaust gas turbocharger decelerates in both operating states. The presence of the two operating states may be recognized particularly easily, for example, by analyzing the position of the ignition switch or the accelerator pedal.

The described fault recognition in the operating state of deceleration of the exhaust gas turbocharger may be implemented particularly easily in that the predefined tolerance range is formed by a predefined threshold value and a fault is recognized if, in the selected operating state, one or more values below the predefined threshold value are established for the change in the variable that is characteristic for the rotational speed of the exhaust gas turbocharger. In this case, it is only necessary to predetermine a single threshold value to predetermine the tolerance range.

A further advantage results if the variable that is characteristic for the change in the rotational speed of the exhaust gas turbocharger is ascertained for at least one predefined time during the selected operating state, in particular until reaching the value 0 for the rotational speed of the exhaust gas turbocharger. In this way, the described fault recognition may be performed with greater reliability upon suitable selection of the predefined time.

The fault recognition may be performed particularly easily in that the ratio of a difference between two values ascertained during the selected operating state of the variable that is characteristic for the rotational speed of the ascertained exhaust gas turbocharger and a difference between the associated instants or crankshaft angles for the occurrence of the two values or a time gradient of the characteristic variable ascertained during the selected operating state for the rotational speed of the exhaust gas turbocharger is selected as the value for the change in the variable that is characteristic for the rotational speed of the exhaust gas turbocharger.

A further simplification in the fault recognition results if a quotient of two values ascertained during the selected operating state of the variable that is characteristic for the rotational speed of the exhaust gas turbocharger is selected as the value for the change in the variable that is characteristic for the rotational speed of the exhaust gas turbocharger.

Exemplary embodiments are illustrated in the drawings and explained in greater detail in the following description.

DETAILED DESCRIPTION

Figure 1:
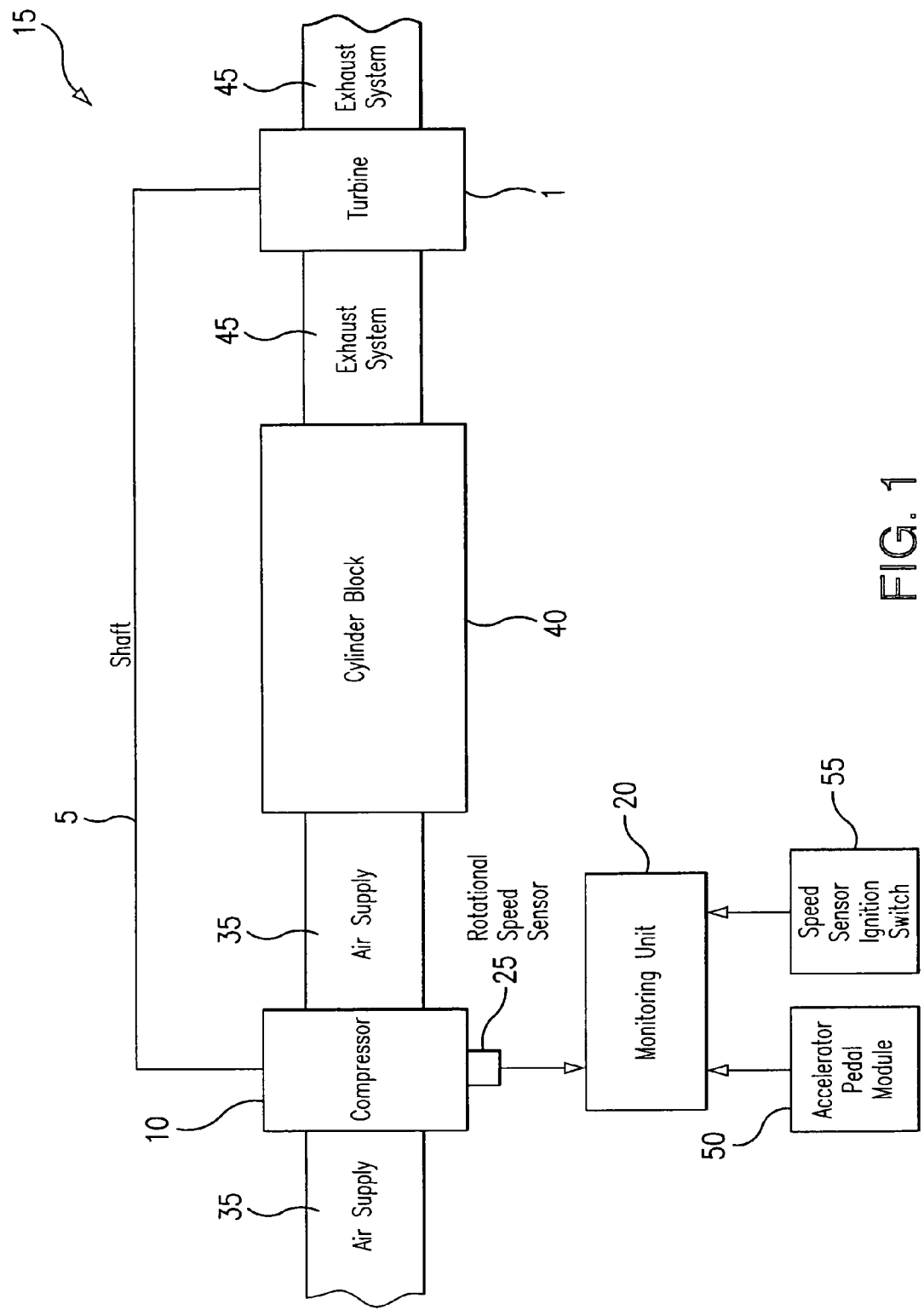
FIG. 1 shows a schematic view of an internal combustion engine.

In FIG. 1, reference numeral 15 identifies an internal combustion engine, which may be implemented as a gasoline engine or as a diesel engine, for example. Internal combustion engine 15 includes a cylinder block 40, to which fresh air is fed via an air supply 35. A compressor 10 of an exhaust gas turbocharger, which compresses the air fed to cylinder block 40 via air supply 35, is situated in air supply 35. Compressor 10 is driven by a turbine 1 via a shaft 5 in an exhaust system 45 of internal combustion engine 15. Turbine 1 is driven by the exhaust gas mass flow of cylinder block 40. A rotational speed sensor 25, which detects a characteristic variable for the rotational speed of the exhaust gas turbocharger continually in time and relays a corresponding measurement signal to a monitoring unit 20, is situated in the area of compressor 10. Monitoring unit 20 may be implemented as software and/or hardware in an engine controller of internal combustion engine 15. In addition, the signal of an accelerator pedal module 50 and the signal of an ignition switch 55 are fed to monitoring unit 20. The exhaust gas turbocharger includes compressor 10, shaft 5, and turbine 1.

The variable that is characteristic for the rotational speed of the exhaust gas turbocharger may be selected as described in the related art cited at the beginning, for example, as the electrical voltage induced by the rotation of the exhaust gas turbocharger and thus compressor 10, as the electrical current induced by the rotation of the exhaust gas turbocharger and thus compressor 10, or as the magnetic field produced by the rotation of the exhaust gas turbocharger and thus compressor 10. Alternatively, rotational speed n of the exhaust gas turbocharger itself may be selected as the characteristic variable for the rotational speed of the exhaust gas turbocharger, rotational speed n of the exhaust gas turbocharger being able to be derived from the following variables: the induced electrical voltage, the induced electrical current, or the produced magnetic field, according to the related art cited at the beginning.

Thus, for example, DE 196 23 236 A1, discussed at the beginning, discusses that a constant magnetic field is produced in proximity to the compressor wheel by a permanent magnet and the resulting eddy currents in the compressor blades are indirectly analyzed. Indirectly means that the changing eddy current in the compressor blades produces an alternating magnetic field. Furthermore, a coil is used as a sensor, in which an AC voltage, whose frequency is equal to the product of compressor rotational speed and number of compressor blades, is induced by the alternating magnetic field. Therefore, if the number of compressor blades is known, the rotational speed of compressor 10 and thus the rotational speed of the exhaust gas turbocharger may be calculated from the frequency of the induced AC voltage.

In a corresponding way, the rotational speed of the exhaust gas turbocharger may also be ascertained or performed by situating rotational speed sensor 25 in an appropriate way at turbine 1, so that in the way described, instead of the rotation of the compressor wheel having the compressor blades, the rotation of the turbine wheel of turbine 1 having the turbine blades is analyzed.

Figure 2:
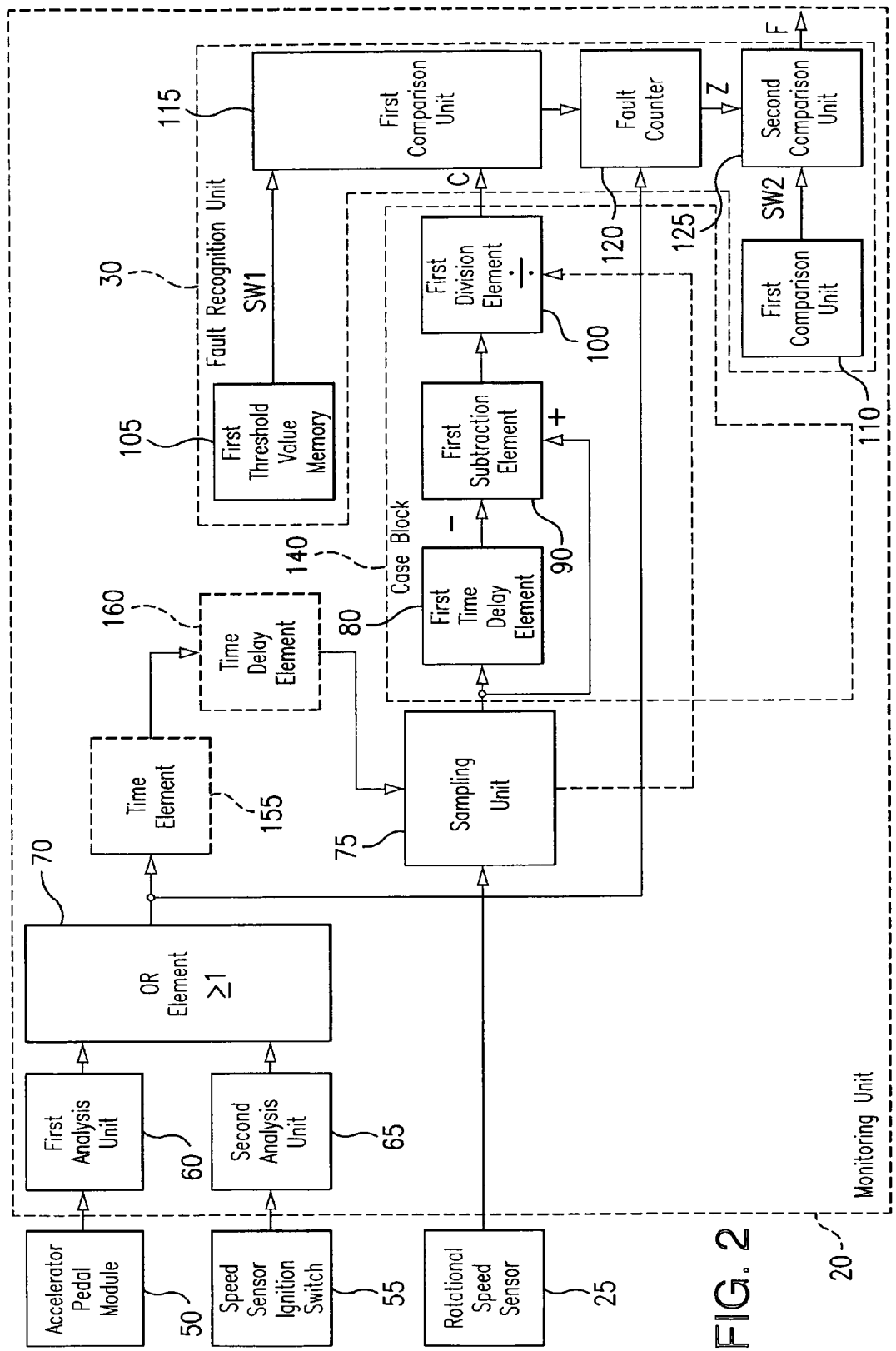
FIG. 2 shows a functional diagram to explain the method according to the present invention and the device according to the present invention according to a first specific embodiment.

FIG. 2 shows a functional diagram for explaining the mode of operation of monitoring unit 20. Monitoring unit 20 may be implemented as software and/or hardware in the form of the functional diagram in FIG. 2. Monitoring unit 20 may be implemented, as described, in the engine controller of internal combustion engine 15 or another arbitrary control unit of internal combustion engine 15 or as an independent software and/or hardware module.

The signal of accelerator pedal module 50, the signal of ignition switch 55, and the signal of rotational speed sensor 25 are fed to monitoring unit 20. The signal of accelerator pedal module 50 is continuous in time and indicates the setting or the position of the accelerator pedal in the case of a vehicle driven by internal combustion engine 15. The signal is fed to a first analysis unit 60. First analysis unit 60 checks on the basis of the fed signal whether the accelerator pedal is released from an actuated state, as it returns into its neutral position. If so, first analysis unit 60 establishes a transition from fired operation or from traction operation into overrun operation and sets its output signal, which is otherwise reset.

The output signal of first analysis unit 60 remains set during the transition from fired operation or traction operation into overrun operation, the duration for this transition being able to be stored in a characteristics map as a function of the current operating point of internal combustion engine 15, for example, which is not shown in FIG. 2 for the sake of clarity. The corresponding characteristics map is situated in first analysis unit 60. The current operating point of the internal combustion engine may, for example, be ascertained as a function of the engine rotational speed of internal combustion engine 15 and the engine load, the engine load being able to be ascertained, for example, as a function of the position of a throttle valve (not shown in FIG. 1) or the duration of a fuel injection (not shown in FIG. 1). The corresponding characteristics map may be applied suitably on a test bench, for example. The output signal of first analysis unit 60 is fed to an OR element 70.

The position of ignition switch 55 is analyzed by a second analysis unit 65, which outputs a setting signal at its output as soon as it is established that the ignition is turned off. The output signal of second analysis unit 65 remains set as long as the ignition remains turned off. The output signal of second analysis unit 65 is also fed to OR element 70. The output of OR element 70 is set as long as at least one of its two input signals is set. The output signal of OR element 70 is fed as an activation signal to a sampling unit 75. As long as the output signal of OR element 70 is set, sampling unit 75 is thus activated; if the output signal of OR element 70 is reset, sampling unit 75 is deactivated and does not output its signal at its output.

The time-continuous measurement signal of rotational speed sensor 25 is additionally fed to sampling unit 75. In the present example, it is to be assumed that the signal values output by rotational speed sensor 25 are values for rotational speed n of compressor 10 and thus of the exhaust gas turbocharger. In a predefined computing time interval of a few milliseconds, for example, of 100 ms, for example, or in a computing interval of a few degrees of crankshaft angle, for example, 180° crankshaft angle, sampling unit 75 samples the rotational speed signal of rotational speed sensor 25 and feeds the sampled values on the one hand directly to a first subtraction element 90 and on the other hand to a first time delay element 80.

If a computing interval from the crankshaft angle is used, the continuous detection of the crankshaft angle by a corresponding crankshaft angle sensor in the area of cylinder block 40 and its forwarding to sampling unit 75 is recommended, so that a corresponding clocking of sampling unit 75 is available for the sampling of the rotational speed signal. However, this is not shown for the sake of clarity in FIGS. 1 and 2. First time delay element 80 delays the sample rotational speed signal of sampling unit 75 by a time interval or crankshaft angle which corresponds to the time interval or crankshaft angle between two sequential sampled values, i.e., 100 ms or 180° crankshaft angle according to the above example. The output of sampling unit 75 delayed by first time delay element 80 is subtracted in first subtraction element 90 from the output of sampling unit 75, and the difference is fed as a numerator to a first division element 100. The time interval or the crankshaft angle between two sequential sampled values is in turn fed as the denominator to first division element 100 by sampling unit 75, i.e., 100 ms or 180° crankshaft angle according to the above example. Output C of first division element 100 is fed to a first comparison unit 115, to which a first threshold value SW1 is additionally fed from a first threshold value memory 105. Value C is calculated according to the above statements as follows:

$$C=(n_k-n_{k-1})/\Delta t \quad (1)$$

where $n_k$ is the sampled value of the rotational speed signal at a sampling time $t_k$, and value $n_{k-1}$ is the sampled value of the rotational speed signal at a sampling time $t_{k-1}$, where $t_{k-1}<t_k$ and $t_k-t_{k-1}=\Delta t$ and thus $\Delta t$ being the time interval between two chronologically neighboring sampling values. In the case of the above alternatively described sampling synchronous to the crankshaft angle, the sampling is performed as described in a predefined crankshaft angle interval, in which two neighboring sampled values are spaced by crankshaft angle $\Delta\phi$ and thus differential angle $\Delta\phi$ is fed by sampling unit 75 as the denominator to first-division element 100, so that in this case output C of first division element 100 is calculated as follows:

$$C=(n_k-n_{k-1})/\Delta\phi \quad (2)$$

First threshold value SW1 defines a tolerance range for differential quotient C ascertained according to equation (1) or equation (2). An operating state of internal combustion engine 15 in which the exhaust gas mass flow decreases is linked to the setting of the output signal of OR element 70. This has the result that the exhaust gas turbocharger decelerates and thus the rotational speed of compressor 10 also decreases to zero. First predefined threshold value SW1 may be calibrated on a test bench in such a way, for example, that with perfect oil supply to the exhaust gas turbocharger and thus adequate lubrication of the bearings which support shaft 5 between turbine 1 and compressor 10, the value does not fall below difference quotient C according to equation (1) or equation (2). First predefined threshold value SW1 thus defines a predefined tolerance range for difference quotient C which extends over all values greater than or equal to first predefined threshold value SW1. Therefore, if first comparison unit 115 receives a differential quotient C less than SW1, it outputs a short setting pulse of a duration less than $\Delta t$ or for a covered crankshaft angle less than $\Delta\phi$ at its output to a fault counter 120, which is then incremented by 1. Fault counter 120 is initialized by a rising flank at the output of OR element 70, i.e., set to zero. Therefore, count Z at the output of fault counter 120 indicates the number of difference quotients C below first predefined threshold value SW1 since the occurrence of the positive flank at the output of OR element 70 and thus since detection of the operating state of deceleration of the exhaust gas turbocharger. Count Z is fed to a second comparison unit 125 and compared therein to a second predefined threshold value SW2 from a second threshold value memory 110. As soon as count Z reaches second predefined threshold value SW2, second comparison unit 125 outputs a set fault signal F at its output, which is used in a way which is not shown for an optical and/or acoustic display at a corresponding display unit and/or for storage in a fault memory, for example. Second predefined threshold value SW2 may be calibrated on a test bench as a compromise value in such a way, for example, that it is as small as possible on the one hand, to be able to detect a fault in the oil supply of the exhaust gas turbocharger as rapidly as possible, and as large as possible on the other hand, to obtain sufficient reliability of the fault diagnosis. Value 1 may be selected as the minimum value for second predefined threshold value SW2. However, in this case fault counter 120 is not required and the output signal of first comparison unit 115 may be used directly as the fault signal, the fault being recognized when first comparison unit 115 outputs the short setting pulse described above.

Instead of differential quotient C, in the event of a time-continuous analysis, the time gradient of the rotational speed signal provided by rotational speed sensor 25 may also be used directly, a gradient calculator then being used instead of sampling unit 75, in which case block 140 in FIG. 2 may be dispensed with. The time gradient of the rotational speed signal is the direct output signal of the gradient calculator as a time-continuous signal and is fed to first comparison unit 115 instead of differential quotient C. The values for first predefined threshold value SW1 and second predefined threshold value SW2 may be applied as described previously. Block 140 includes first time delay element 80, first subtraction element 90, and first division element 100. First threshold value memory 105, second threshold value memory 110, first comparison unit 115, second comparison unit 125, and fault counter 120 form a fault recognition unit 30.

Figure 3:
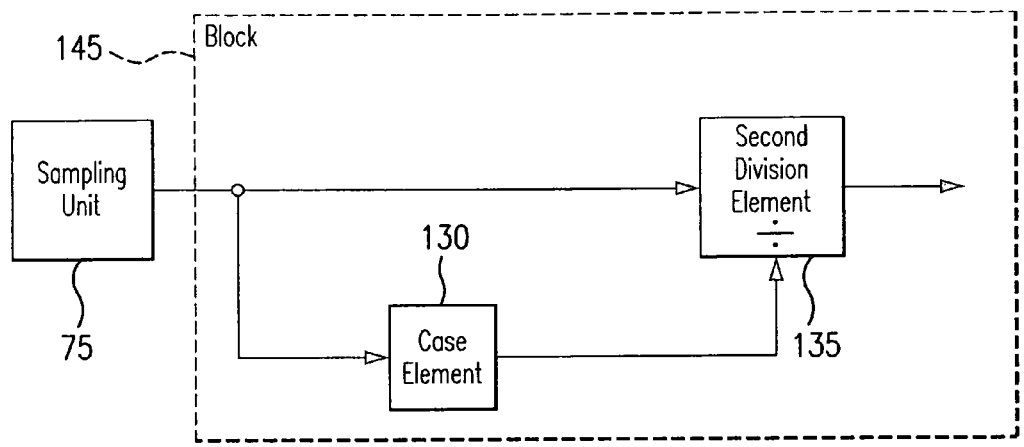
FIG. 3 shows a detail of a functional diagram from FIG. 2 to explain a second specific embodiment of the method according to the present invention and the device according to the present invention.
Figure 4:
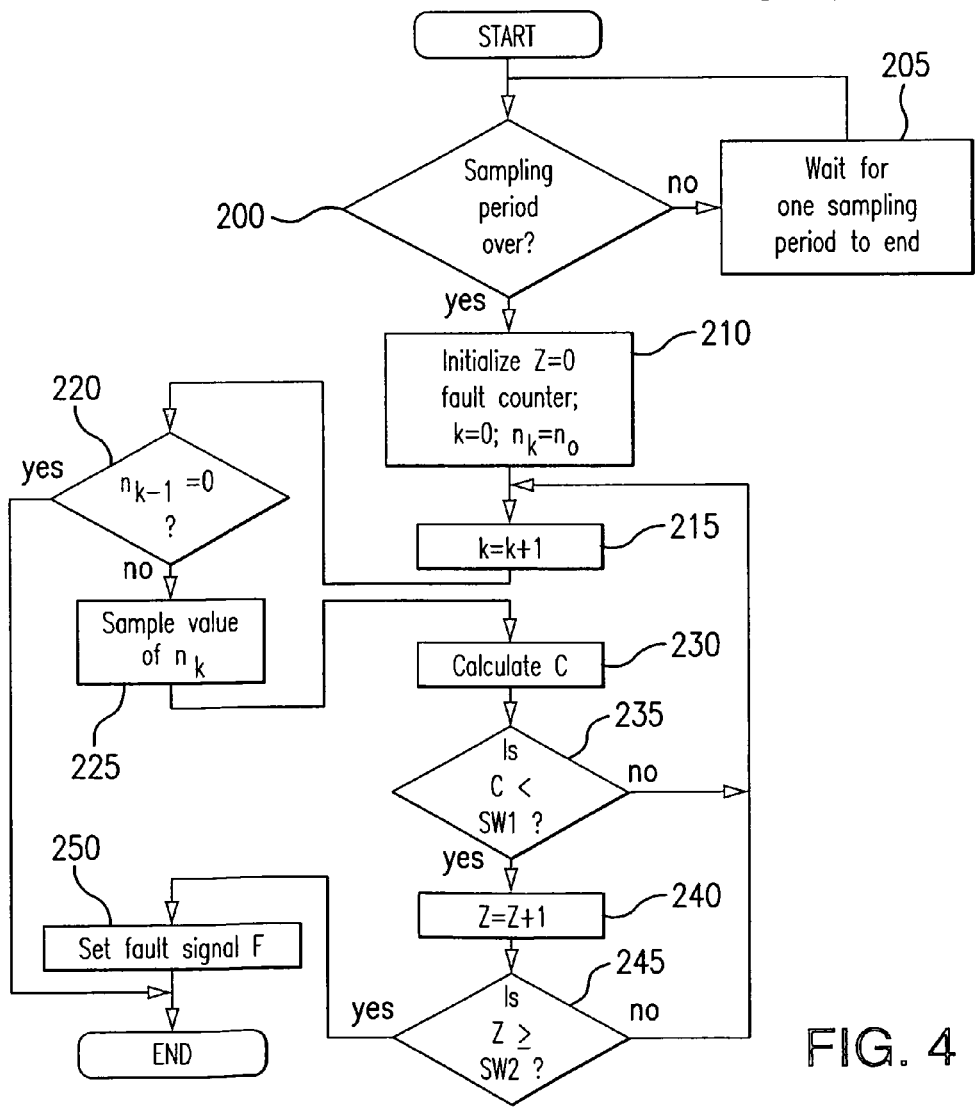
FIG. 4 shows a flow chart of an exemplary sequence of the method according to the present invention.

According to a further alternative specific embodiment according to FIG. 3, instead of block 140, block 145 is used. Otherwise, the construction of the functional diagram is identical to that in FIG. 2. In the specific embodiment according to FIG. 3, block 145 includes a second time delay element 130 and a second division element 135. In this case, the sampled values at the output of sampling unit 75 are delayed by $\Delta t$ or $\Delta\phi$ by second time delay unit 130 and subsequently fed as the denominator to second division element 135. The sampled values in the output of sampling unit 75 are additionally fed directly as the numerator to second division element 135.

Output C of second division element 135, which is fed to first comparison unit 115 as in FIG. 2, results as follows:

$$C = n_k / n_{k-1} \quad (3)$$

First threshold value SW1 has to be applied as a threshold value for rotational speed quotient C according to equation (3). The tolerance range for rotational speed quotient C according to equation (3) defined by first threshold value SW1 extends to all values for this rotational speed quotient which are greater than or equal to first predefined threshold value SW1. First predefined threshold value SW1 is applied in such a way, for example, that in the event of perfect oil supply to the exhaust gas turbocharger, rotational speed quotient C according to equation (3) is greater than or equal to first predefined threshold value SW1 and is otherwise less than first predefined threshold value SW1. Second predefined threshold value SW2 may be applied as described above.

A flow chart for an exemplary sequence of the method according to the present invention is shown in FIG. 3. After the start of the program when the ignition is turned on, first analysis unit 60 checks on the basis of the signal of accelerator pedal module 50 whether there is a transition from traction operation to overrun operation. Furthermore, second analysis unit 65 checks on the basis of the signal of ignition switch 55 whether the ignition has been turned off. As soon as a transition from traction operation to overrun operation or turning off of the ignition is recognized, the output signal of OR element 70 is set and the sequence branches to a program point 210. Otherwise, the output signal of OR element 70 remains reset and the sequence branches to a program point 205.

At program point 205, the sequence waits for one sampling period $\Delta t$ or $\Delta \phi$ and subsequently branches back to program point 200.

At program point 210, fault counter 120 is initialized and set to zero. Furthermore, a sampled value counter k is set to zero and first sampled value $n_k = n_0$ is output by sampling unit 75. Subsequently, the sequence branches to a program point 215.

At program point 215, counter k is incremented by 1, i.e., set to k=k+1. Subsequently, the sequence branches to a program point 220.

At program point 220, sampling unit 75 checks whether last sampled rotational speed value $n_{k-1}$ is equal to zero. If so, the sequence leaves the program, otherwise it branches to a program point 225.

At program point 225, sampling unit 75 samples next rotational speed value $n_k$ from the rotational speed signal of rotational speed sensor 25 one sampling period $\Delta t$ or $\Delta \phi$ liter. Subsequently, the sequence branches to a program point 230.

At program point 230, block 140 or block 145 calculates value C according to one of equations (1), (2), or (3) as described. Subsequently, the sequence branches to a program point 235.

At program point 235, first comparison unit 115 checks whether C is less than SW1. If so, the sequence branches to a program point 240, otherwise it branches back to program point 215.

At program point 240, the fault counter is incremented by 1. Subsequently, the sequence branches to a program point 245.

At program point 245, second comparison unit 125 checks whether count Z is greater than or equal to second predefined threshold value SW2. If so, the sequence branches to a program point 250, otherwise it branches back to program point 215.

At program point 250, fault signal F is set and an optical and/or acoustic display of the fault and/or a storage of fault signal F in a fault memory is/are initiated. The sequence subsequently leaves the program.

Figure 5:
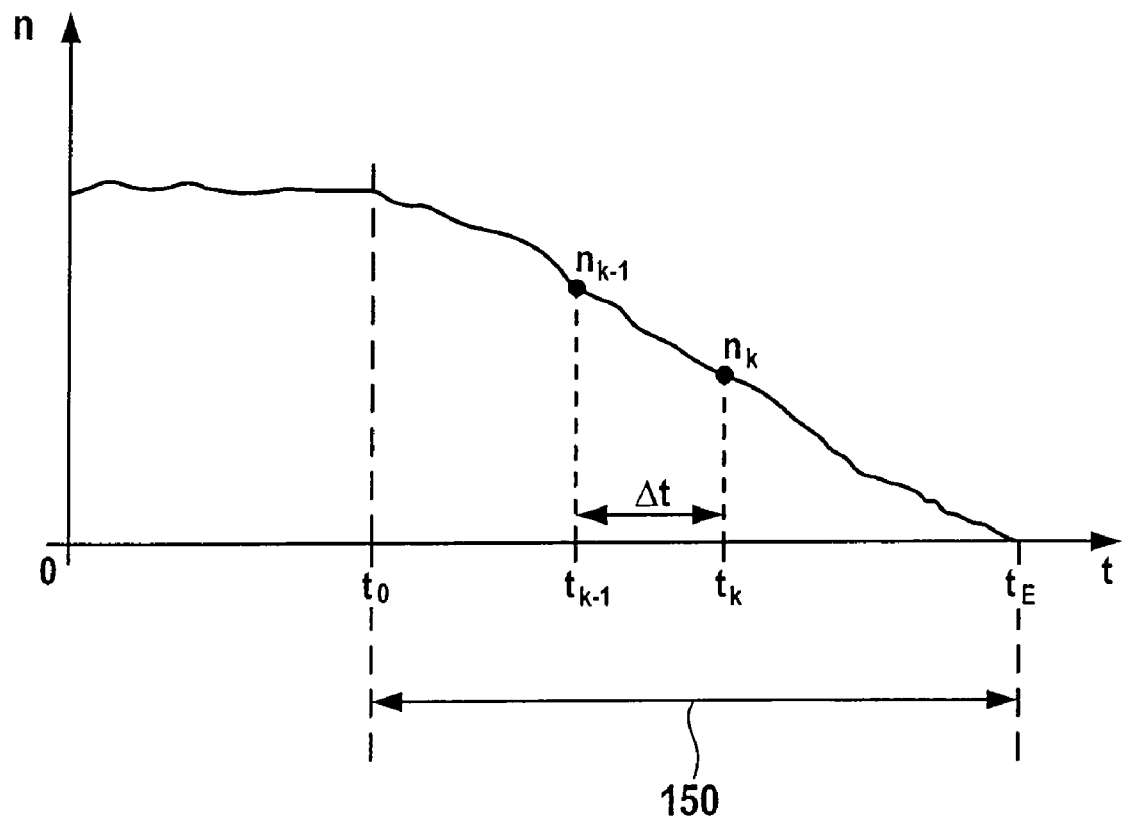
FIG. 5 shows the time curve of the rotational speed of an exhaust gas turbocharger of an internal combustion engine in an operating state in which the exhaust gas turbocharger decelerates.

An exemplary curve of rotational speed signal n over time t is shown in FIG. 5. At an instant $t_0$, the operating state of deceleration of the exhaust gas turbocharger is achieved, in that the ignition is turned off or there is a changeover from traction operation to overrun operation. Therefore, from first instant $t_0$, rotational speed n of the exhaust gas turbocharger drops, to reach the value 0 at a final instant $t_E$. If the internal combustion engine is shut down by turning off the ignition, the time between first instant to and final instant $t_E$, identified in FIG. 5 by reference numeral 150, is referred to as the after-run time of the engine control unit. Final instant $t_E$ may also be interpreted as the instant of reaching overrun operation after prior traction operation.

Time period 150 is generally the time which is available at most for diagnosing the change in the variable that is characteristic for the rotational speed of the exhaust gas turbocharger. For example, two sampled values $n_{k-1}$ and $n_k$ are plotted in FIG. 5 which were sampled at sampling instants $t_{k-1}$ and $t_k$ by sampling unit 75, where $t_k - t_{k-1} = \Delta t$.

Through the device and method described, preventive monitoring of the oil supply of the exhaust gas turbocharger is made possible. The change in the rotational speed of the exhaust gas turbocharger or the variable that is characteristic for the rotational speed of the exhaust gas turbocharger over time in the form of value C or the time gradient of the variable that is characteristic for the rotational speed of the exhaust gas turbocharger are analyzed in the way described. If the ignition is turned off at instant $t_0$, the engine control unit or monitoring unit 20 enters a state in which it still processes its input signals in the way described. Therefore, time period 150 is referred to in this case as the so-called control unit after-run.

Time period 150 from first instant $t_0$ to final instant $t_E$ is available at most for the affected operating state in which the exhaust gas turbocharger decelerates, i.e., in which rotational speed n of the exhaust gas turbocharger drops to zero, for ascertaining the sampled values of the signal characteristic for the rotational speed of the exhaust gas turbocharger to diagnose the oil supply. Accordingly, second predefined threshold value SW2 is to be selected as greater than the number of maximum possible sampling instants during time period 150 minus 1. Otherwise, the fault diagnosis described using value C according to equations (1), (2), (3) is no longer possible.

The minimum duration for ascertaining the sampled values may not fall below $\Delta t$, so that at least two sampled values, which are required at a minimum to be able to calculate value C according to equation (1), equation (2), or equation (3), may be delivered to sampling unit 75.

Any arbitrary time may be predefined between this minimum duration and time period 150 according to FIG. 5, during which the sampled values for the described fault diagnosis may be obtained from the time curve of rotational speed n. This predefined time for ascertaining the sampled values may also be situated arbitrarily within time period 150 according to FIG. 5, but is not to exceed final time $t_E$.

The start of the sampling may be initiated with an appropriate delay by a time delay element 160 optionally situated between the output of OR element 70 and the assigned input of sampling unit 75.

The time for ascertaining the sampled values is generally to be predefined in such a way that on the one hand it is not too great to allow the most rapid possible diagnosis of the oil supply and, on the other hand, it is not too small to allow the most reliable possible diagnosis of the oil supply. This fixed predefined time for ascertaining the sampled values may be implemented, for example, in that the output signal of OR element 70 is fed to a time element 155, which resets a fed setting signal again at latest after passage of the predefined time. This optionally provided time element 155 is indicated by dashed lines in FIG. 2. Previously described and also optionally provided time delay element 160, which situates the predefined time arbitrarily during time period 150, is indicated in FIG. 2 by dashed lines. Both time element 155 and time delay element 160 may be provided optionally and independently of one another.

If value C is below first predefined threshold value SW1, increased friction in the bearings of the exhaust gas turbocharger may be inferred. The fault in the oil supply is recognized when this falling below first predefined threshold value SW1 is established at least SW2 times during the predefined time for ascertaining the sampled values.

According to FIG. 5, minimum duration $\Delta t$ may be viewed as an example of the predefined time for ascertaining the sampled values, during which both sampled values $n_{k-1}$ and $n_k$ are ascertained and which is sufficient for a complete fault diagnosis using SW2=1.

Furthermore, this predefined time lies within time period 150 in such way that it includes neither first time $t_0$ nor final time $t_E$, but rather is situated approximately in the middle during time period 150.

After passage of time period 150, i.e., upon reaching final instant $t_E$, in the case of the control unit after-run, the engine control unit or the monitoring unit is turned off.

In principle, any operating state which is characterized by a change in the exhaust gas mass flow, which in the fault-free case is linked to a change in the variable that is characteristic for the rotational speed of the exhaust gas turbocharger within a predefined tolerance range, may be selected for ascertaining the sampled values and/or the described time gradient of the variable that is characteristic for the rotational speed of the exhaust gas turbocharger, so that if one or more values C according to equation (1), (2), or (3) or the described time gradient lies below first predefined threshold value SW1, a fault of the oil supply or the lubrication of the bearings of shaft 5 of the exhaust gas turbocharger is recognized.

If the time gradient of rotational speed signal n of the exhaust gas turbocharger is used instead of value C according to equations (1), (2), (3), the predefined time for ascertaining this time gradient from the rotational speed signal may be selected as arbitrarily small theoretically, may correspond at most to time period 150 according to FIG. 5, and may otherwise be situated arbitrarily within this time period 150. This predefined time may also be situated in the way described during time period 150 with the aid of time element 155 and/or time delay element 160.

What is claimed is:

1. A method for monitoring an exhaust gas turbocharger of an internal combustion engine, the method comprising:
   determining a variable that is characteristic of a rotational speed of the exhaust gas turbocharger in at least one operating state of the internal combustion engine using a rotational speed sensor;
   selecting an operating state, which is characterized by a change in an exhaust gas mass flow which is linked to a change in the variable that is characteristic of the rotational speed of the exhaust gas turbocharger within a predefined tolerance range, as the at least one operating state using an analysis unit;
   comparing the change in the variable that is characteristic of the rotational speed of the exhaust gas turbocharger to the predefined tolerance range using a comparison unit; and
   recognizing a fault if, in the selected operating state, at least one value outside the predefined tolerance range is established using a fault recognition unit.

2. The method of claim 1, wherein: one of the rotational speed of the exhaust gas turbocharger, an electrical voltage induced by a rotation of the exhaust gas turbocharger, and a magnetic field produced by the rotation of the exhaust gas turbocharger is selected as the variable that is characteristic of the rotational speed of the exhaust gas turbocharger.

3. The method of claim 1, wherein an operating state in which the exhaust gas turbocharger decelerates is selected as the at least one operating state.

4. The method of claim 3, wherein an operating state in which the internal combustion engine is shut down is selected as the at least one operating state.

5. The method of claim 3, wherein an operating state in which a transition from fired operation to overrun operation occurs is selected as the at least one operating state.

6. The method of claim 3, wherein the predefined tolerance range is formed by a predefined threshold value, and a fault is recognized if, in the selected operating state, at least one value below the predefined threshold value is established for the change in the variable that is characteristic of the rotational speed of the exhaust gas turbocharger.

7. The method of claim 1, wherein the variable that is characteristic of the change in the rotational speed of the exhaust gas turbocharger is determined for at least one predefined time during the selected operating state, until reaching a value zero of the rotational speed of the exhaust gas turbocharger.

8. The method of claim 1, wherein a ratio of a difference between two values determined during the selected operating state of the variable that is characteristic of the rotational speed of the exhaust gas turbocharger and a difference between the associated instances or crankshaft angles of the occurrence of the two values or a time gradient of the variable that is characteristic of the rotational speed of the exhaust gas turbocharger determined during the selected operating state is selected as a value of the change in the variable that is characteristic of the rotational speed of the exhaust gas turbocharger.

9. The method of claim 1, wherein a quotient of two values determined during the selected operating state of the variable that is characteristic of the rotational speed of the exhaust gas turbocharger is selected as a value for the change in the variable that is characteristic of the rotational speed of the exhaust gas turbocharger.

10. A device for monitoring an exhaust gas turbocharger of an internal combustion engine, comprising:
    an arrangement to determine a variable that is characteristic of the rotational speed of the exhaust gas turbocharger in at least one operating state of the internal combustion engine, wherein the at least one operating state is an operating state which is characterized by a change in an exhaust gas mass flow, which is linked to a change in the variable that is characteristic of the rotational speed of the exhaust gas turbocharger within a predefined tolerance range;
    a comparison arrangement to compare the change in the variable that is characteristic of the rotational speed of the exhaust gas turbocharger to the predefined tolerance range; and
    a fault recognition arrangement to recognize a fault when it is established that one or more values are outside the predefined tolerance range.

11. The method of claim 1, wherein the predefined tolerance range is calibrated according to a predetermined lubrication level of a turbocharger bearing.

* * * * *